United States Patent
Chen et al.

(10) Patent No.: US 10,921,645 B2
(45) Date of Patent: Feb. 16, 2021

(54) DISPLAY MODULE

(71) Applicant: AU OPTRONICS CORPORATION, Hsin-Chu (TW)

(72) Inventors: Ming-Lung Chen, Hsin-Chu (TW); Ming-Chun Hsu, Hsin-Chu (TW); Cheng-Chuan Chen, Hsin-Chu (TW); Li-Jia Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/666,996

(22) Filed: Oct. 29, 2019

(65) Prior Publication Data

US 2020/0133072 A1 Apr. 30, 2020

(30) Foreign Application Priority Data

Oct. 30, 2018 (TW) .............................. 107138446 A (51) Int. Cl.
*G02F 1/13357* (2006.01)
*G02F 1/1335* (2006.01)

(52) U.S. Cl.
CPC .. *G02F 1/133606* (2013.01); *G02F 1/133504* (2013.01); *G02F 1/133611* (2013.01); *G02F 1/133603* (2013.01); *G02F 2001/133507* (2013.01); *G02F 2001/133607* (2013.01)

(58) Field of Classification Search
CPC ........ G02F 2001/133607; G02F 2001/133507; G02F 1/133526
See application file for complete search history.

(56) References Cited

U.S. PATENT DOCUMENTS

| | | | |
|---|---|---|---|
| 5,557,433 A | 9/1996 | Maruyama et al. | |
| 5,598,281 A * | 1/1997 | Zimmerman | G02F 1/133606 349/5 |
| 2010/0171906 A1* | 7/2010 | Sakai | G02F 1/133528 349/96 |
| 2012/0287677 A1* | 11/2012 | Wheatley | G02B 6/0053 362/627 |
| 2014/0355125 A1 | 12/2014 | Boyd et al. | |
| 2015/0036080 A1* | 2/2015 | Yan | G02F 1/1335 349/96 |

* cited by examiner

*Primary Examiner* — James A Dudek
(74) *Attorney, Agent, or Firm* — WPAT, PC (57) ABSTRACT

A display module includes a backlight module, a liquid crystal layer disposed on the backlight module, and a first light-expanding layer disposed on the liquid crystal layer. The backlight module provides a surface light source. The surface light source forms an image light through the liquid crystal layer, and the first light-expanding layer increases the viewing angle range of the image light along a first direction. The first light-expanding layer substantially extends along a virtual plane, the first direction is perpendicular to the normal of the virtual plane, and a second direction is perpendicular to the first direction and the normal of the virtual plane. The light intensity at the 60-degree viewing angle of the surface light source along the first direction is lower than the light intensity at the 60-degree viewing angle of the surface light source along the second direction.

19 Claims, 10 Drawing Sheets

DISPLAY MODULE

BACKGROUND OF THE INVENTION

1. Field of the Invention

This disclosure relates to a display module, especially a display module that is able to provide image in a relatively wider range of viewing angle.

2. Description of the Prior Art

Display technology has been improved in applications such as digital television, computer screen, etc. With the characterizations of thin thickness, high definition, low power consumption, display modules or display devices applied to the instruments or devices in the professional fields such as medical, automobile, and advertising are also being continuously improved to provide a better user experience.

The luminance of liquid crystal display (LCD) is the product of the luminance of the backlight source and the transmittance of the liquid crystal. Luminance of backlight source differs in different emission angles. Therefore, changes in brightness, contrast, and color will be perceived from different viewing angles. Through appropriate optical design, these changes can be minimized to produce wide viewing angle LCDs.

SUMMARY OF THE INVENTION

This disclosure provides a display module capable of providing a wide viewing angle image and reducing light leakage.

The disclosure provides a display module including a backlight module, a liquid crystal layer, and a first light-expanding layer. The backlight module provides a surface light source. The liquid crystal layer is disposed on the backlight module, and the surface light source forms an image light through the liquid crystal layer. The first light-expanding layer is disposed on the liquid crystal layer and is configured to increase the viewing angle of the image light along a first direction.

The first light-expanding layer substantially extends along a virtual plane. The first direction is perpendicular to a normal of the virtual plane, and a second direction is perpendicular to the first direction and the normal of the virtual plane. A luminance of the surface light source at 60-degree viewing angle along the first direction is lower than the luminance of the surface light source at 60-degree viewing angle along the second direction. The viewing angle is an angle between an observing direction and the normal of the virtual plane.

The display module provided in this disclosure includes a backlight module and a first light-expanding layer. The divergence angle of the surface light source provided by the backlight source in the first direction is smaller, and the light leakage on the first light-expanding layer can be decreased.

DETAILED DESCRIPTION OF THE PREFERRED EMBODIMENT

The display module of this disclosure can display good quality images. The display module preferably has a wide viewing angle, so users in front of the display module can see clear images at various angles. The display module disclosed herein may be applied to computer screens, television screens, and other fields such as Point of sale, self-service KIOSK, industrial PC, security system, amusement machine, medical equipment, factory automation, digital singage, transportation information display, outdoor display, navigation display, etc. This disclosure is not limited to the application fields listed above.

It should be understood that, even though the terms such as "First", "Second", "Third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

Figure 1A:
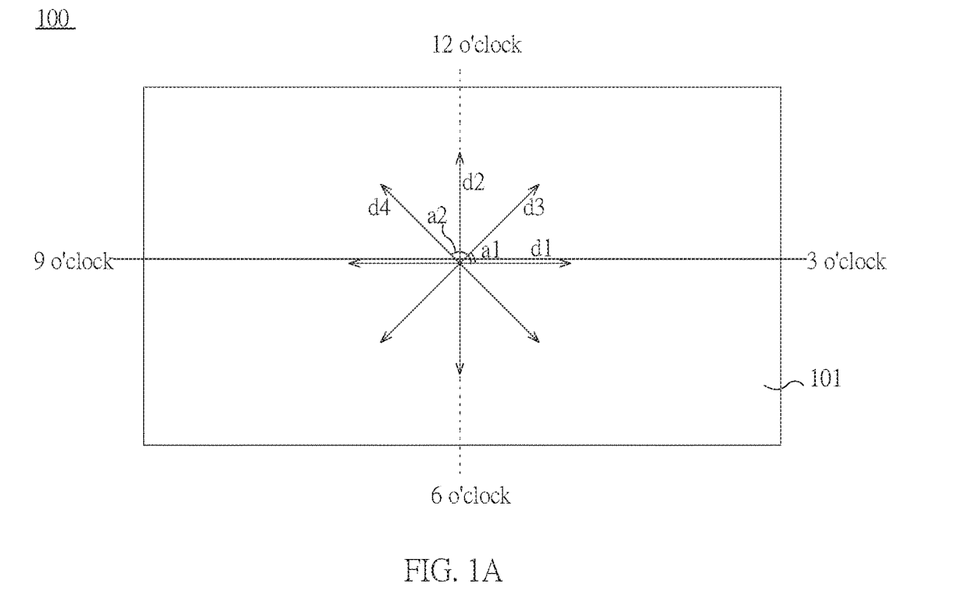
FIG. 1A illustrates a schematic view of a display module of a first embodiment of this disclosure.

FIG. 1A illustrates a schematic front view of a display module of a first embodiment of this disclosure. Please refer to FIG. 1A. The display module 100 in the first embodiment may provide the image light L4 from the light-emitting surface 101, and the image light L4 has a relatively wider range of viewing angle along the first direction d1.

More specifically, in this embodiment, the first direction d1 is perpendicular to the normal of the light-emitting surface 101. The first direction d1 is the left-to-right direction seen by a viewer facing the light-emitting surface 101 of the display module 100. In other words, the first direction d1 is the 3-9 o'clock direction of the light-emitting surface 101. The second direction d2 perpendicular to the first direction d1 is the up-down direction seen by the viewer facing the light-emitting surface 101. In other words, the second direction d2 is the 12-6 o'clock direction of the light-emitting surface 101. The third direction d3 and the fourth direction d4 are also perpendicular to the normal of the light-emitting surface 101, wherein the angle a1 between the third direction d3 and the first direction d1 is 45 degrees, and the angle a2 between the fourth direction d4 and the first direction d1 is 135 degrees. The display module 100 of this embodiment provides an image with a wide viewing angle, so the quality of the displayed image seen by a viewer will not change as the viewer moves along the left-to-right (or right-to-left) direction (i.e. the 3-9 o'clock direction).

The viewing angle will be described with reference to the directions d1 to d4 described above; however, it should be noted that this disclosure is not limited to the direction and angles described above. The person having ordinary skills in this art may adjust the direction corresponding to the wide viewing angle without departing from the spirit of this disclosure.

Figure 1B:
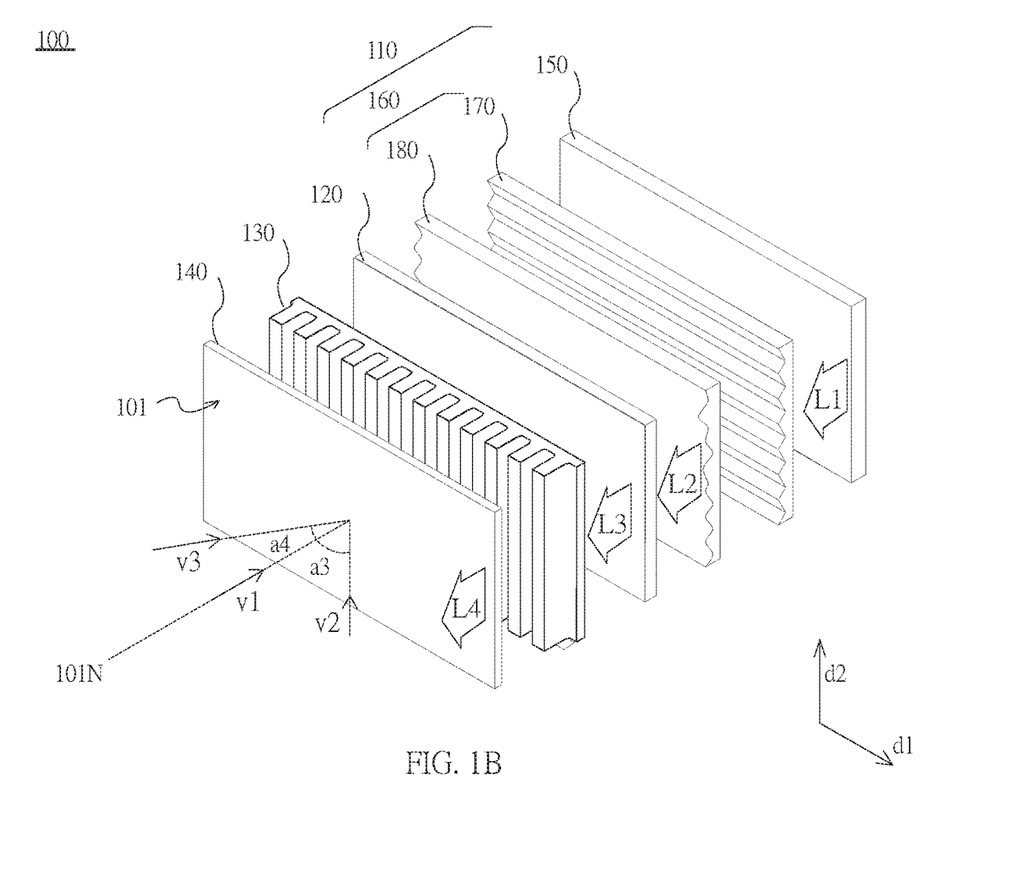
FIG. 1B illustrates a 3D exploded view of the display module of the first embodiment of this disclosure.

FIG. 1B illustrates a 3D exploded view of the display module of the first embodiment of this disclosure. For purposes of clarity and not limitation, thickness and surface structures of some layers, films, panels, area, etc. are enlarged. The same reference number refers to the same elements throughout this disclosure. It should be understood that, when an element such as a layer, a film, a panel, a region or a substrate are described as "being on" or "being connected to" another element, they may be directly on or connected to another element, or there may be other elements therebetween. On other hands, when an element is described as "directly exists on another element" or "directly connects to" another element, there is no element therebetween.

Please refer to FIG. 1B; the display module 100 includes a backlight module 110, a liquid crystal layer 120 and a first light-expanding layer 130. The light-emitting surface 101 is near the first light-expanding layer 130. The elements mentioned above are arranged along the normal 101N of the light-emitting surface 101. The first light-expanding layer 130 extends along a virtual plane, which is substantially parallel to the light-emitting surface 101, and the normal of the virtual plane is substantially in the same direction as the normal 101N of the light-emitting surface 101. The description of the virtual plane and the normal of the virtual plane of this embodiment will be given with the light-emitting surface 101 and the normal 101N as an example.

Referring to FIG. 1B, viewing angle is the angle between the observation direction of the viewer and the normal 101N of the light-emitting surface 101. For example, the observation direction v1 is the direction pointing into the light-emitting surface 101, which is substantially along the normal 101N, i.e., substantially a direction parallel to the normal 101N. The angle between the observation direction v1 and the normal 101N is 0 degrees, i.e., the viewing angle of the observation direction v1 is 0 degrees. Taking observation direction v2 and observation direction v3 for example, the angle between the observation direction v2 and the normal 101N is a3 degrees, i.e., the viewing angle of the observation direction v2 is a3 degrees; the angle between the observation direction v3 and the normal 101N is a4 degrees, i.e., the viewing angle of the observation direction v3 is a4 degrees, wherein the viewing angle a3 is larger than the viewing angle a4. The description given above is for the purposes of clarity and not limitation.

The backlight module 110 provides a surface light source to the liquid crystal layer 120. The surface light source forms an image light L3 after going through the liquid crystal layer 120. The first light-expanding layer 130 is configured to increase the viewing angle range of the image light L3, so as to form an image light L4 that is able to provide an image with a wider viewing angle.

Figure 2:
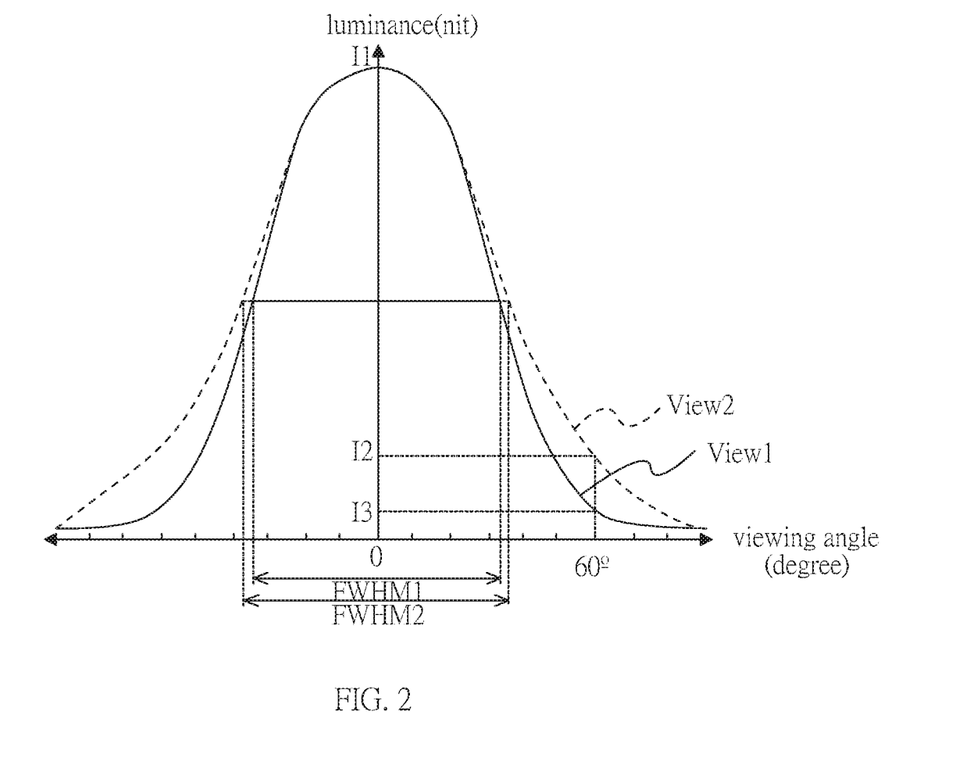
FIG. 2 shows the luminance distribution of the display module of the first embodiment of this disclosure at different viewing angles along different directions.

In this embodiment, the surface light source provided by the backlight module 110 has a relatively smaller divergence angle along the first direction d1, and thus is more collimated along the first direction d1, while along the second direction d2, the surface light source has a relatively larger divergence angle and thus is less collimated along the second direction d2. More specifically, the difference between the luminance of the surface light source at 60-degree viewing angle and the luminance of the surface light source at the 0-degree viewing angle along the first direction d1 is larger than that along the second direction d2. In other words, the luminance of the surface light source observed at 60-degree viewing angle along the first direction d1 is lower than the luminance of the surface light source observed at 60-degree viewing angle along the second direction d2. Preferably, the divergence angle of the surface light source in the first direction d1 may be defined as the angular Full-Width-at-Half-Maximum (FWHM) of the luminance distribution curve of the surface light source on a surface that is parallel to the first direction d1 and perpendicular to the surface light source (as shown in FIG. 2). In other words, a smaller divergence angle means a smaller angular FWHM of the luminance distribution curve of the surface light source on the surface described above.

As a result, in this embodiment, light leakage is decreased or even resolved when the viewing angle of the image light L3 along the first direction d1 is increased by the first light-expanding layer 130.

In this embodiment, the first light-expanding layer 130 is adjacent to the upper polarizer 140 of the liquid crystal layer 120 (i.e., adjacent to the light-emitting surface 101), and the other side of the liquid crystal layer 120 is provided with a lower polarizer (not shown), so that the transmittance of the liquid crystal layer 120 can be controlled by polarization of light. The first light-expanding layer 130 is between the upper polarizer 140 and the liquid crystal layer 120 to increase the viewing angle range of the image light L3 along the first direction d1 and form the image light L4, so that the display image formed by the image light L4 has a wider viewing angle. The first light-expanding layer of this disclosure is not limited to the first light-expanding layer 130 described above; in other embodiments, the first light-expanding layer may be configured on the upper polarizer or even configured as a polarization light-expanding film on the liquid crystal layer.

Elements of the first embodiment will be further described below. The backlight module 110 of this embodiment includes a backlight source 150 and a complex optical layer 160. The backlight source 150 is configured to provide a first illumination light L1 that propagates towards the complex optical layer 160. The backlight source 150 may be, for example, a light emitting diode (LED) or a cold cathode fluorescent lamp (CCFL). The backlight source 150 may be of direct back-lit type or edge lit type. In one embodiment, the backlight source 150 includes a plurality of light-emitting units to form a direct back-lit backlight. The light-emitting units are preferably mini LEDs or micro LEDs (μLEDs). In one embodiment, the light-emitting units are distributed along another virtual plane that is parallel to the virtual plane mentioned above. The backlight source 150 is configured to provide the local dimming function by turning on some of the light-emitting units corresponding to areas of the liquid crystal layer 120, which have higher transmittance, but not limited thereto.

The complex optical layer 160 of this embodiment receives the first illumination light L1 and forms the second illumination light L2, wherein the complex optical layer 160 includes, for example, a plurality of optical films. The second illumination light L2 is formed through refraction or reflection of light and serves as the surface light source of the liquid crystal layer 120. In the embodiments of this disclosure, the display module 100 provides an image having a wider viewing angle and lowers the light leakage simultaneously by means of the complex optical layer 160, which controls the physical characteristics of light, so light leakage of the light-emitting surface 101 may be decreased in large viewing angle directions. Description of the complex optical layer 160 will be given after the exemplary description of other elements of the display module 100 below.

The liquid crystal layer 120 of this embodiment serves as a light valve in the display module 100 to control the transmittance between the complex optical layer 160 and the light-emitting surface 101. More specifically, when the image light L4 forms an image, the transmittance of every pixel in the image is controlled by the deflection angle of the liquid crystal molecules of the liquid crystal layer 120. The deflection angle of the liquid crystal molecules is controlled by the electrical field intensity generated by the pixel circuits. Each of the pixel circuits may control the signal that generates electrical field through TFT (thin-film transistor). In other words, the liquid crystal layer 120 of this embodiment may be, for example, a TFT LCD. The exemplary description of each of the elements of the liquid crystal layer are only exemplary and does not intend to limit this disclosure.

The liquid crystal layer 120 of the first embodiment forms the image light L3 from the second illumination light L2, which is received from the complex optical layer 160 and forms the surface light source. The image light L3 may form an image on the light-emitting surface 101 after going through the first light-expanding layer 130. In this embodiment, the first light-expanding layer 130 is configured to increase the range of the light-emission angle at each position of the light-emitting surface 101, so that the image light L3 may form the image light L4 that has a wider viewing angle.

In this embodiment, the complex optical layer 160 of the display module 100 is configured to adjust the first illumination light L1 to form the second illumination light L2, so as to avoid leakage of the image light L3 on the light-emitting surface 101. The luminance distribution along the first direction d1 may be adjusted by the complex optical layer 160, i.e., the complex optical layer 160 may adjust the light intensity per unit area along the first direction d1.

FIG. 2 shows the luminance distribution of the display module of the first embodiment of this disclosure at different viewing angles along different directions. Please refer to FIG. 2; View1 is the angular luminance distribution (in nits) of the surface light source along the first direction d1. View2 is the angular luminance distribution along the second direction d2. The luminance is observed, for example, from the same position and in different direction or different viewing angle, so the luminance is substantially the same when the viewing angle is 0 degree. More specifically, the display module 100 of this embodiment adjusts the second illumination light L2 from the backlight module 110, so that the image light L3 may have a similar or substantially same luminance distribution. Description of luminance distribution of each direction and viewing angle will be given below, taking second illumination light L2 for example, but this disclosure is not limited to the description. The distribution of the intensity or luminance of the light can be adjusted according to the characteristics of the liquid crystal layer 120, so that the image light L3 may have the preferable distribution of light intensity or luminance as described below.

In the viewing angle range along the first direction d1, the luminance of the surface light source at 0-degree view angle is l1, and the luminance of the surface light source at 60-degree view angle is l3. The complex optical layer 160 of this embodiment can enable the surface light source to satisfy the following condition:

$$6\% \leq (l3/l1) \times 100\% \leq 12\%.$$

That is, the light intensity per unit area in a large viewing angle range may be lowered by the complex optical layer 160, so the light concentrates in a small viewing angle range.

In the viewing angle range along the second direction d2, the luminance of the surface light source at 0-degree view angle is l1, and the luminance of the surface light source at 60-degree view angle is l2. The complex optical layer 160 of this embodiment can enable the surface light source to satisfy the following condition:

$$19\% \leq (l2/l1) \times 100\%.$$

In other words, for the surface light source formed by the second illumination light L2 after being adjusted by the complex optical layer 160, the ratio of the luminance at 60-degree viewing angle along the first direction d1 to the luminance at 60-degree viewing angle along the second direction d2 roughly falls in the range of 0.3 to 0.7. With the adjustment of the complex optical layer 160, the light leakage of the light-emitting surface 101 along the first direction d1 is lowered, especially in the condition of low brightness. In other words, the complex optical layer 160 provides light condensation effect along the first direction d1, and substantially maintains the same luminance distribution along the second direction d2, so that the display module 100 provides an image of wide viewing angle and drastically reduces light leakage on the light-emitting surface 101.

In other embodiments of this disclosure, luminance distribution along the third direction d3 and the fourth direction d4 may be similar to the luminance distribution along first direction d1, i.e., observing from 60-degree viewing angle, the luminance distribution along the third direction d3 and the luminance distribution along the fourth direction d4 are lower than the luminance distribution along the second direction d2.

More specifically, the luminance distribution of the surface light source along the third direction d3 and the luminance distribution along the fourth direction d4 will also satisfy the following condition:

$$6\% \leq (l3/l1) \times 100\% \leq 12\%$$

wherein l3 is the luminance at 60-degree viewing angle along the third direction d3 or the fourth direction d4, and l1 is the luminance at 0-degree viewing angle. By means of the surface light source which is formed by the second illumination light L2 adjusted by the complex optical layer 160, and the image light L3 which is formed by the surface light source and has similar luminance distribution, the light leakage on the light-emitting surface 101 is greatly reduced. Nevertheless, this disclosure is not limited to the embodiment, person having ordinary skills in this art may adjust depending on the requirement of brightness.

The first embodiment and some other embodiments of the complex optical layer of this disclosure will be further described below. Please refer to FIG. 1B, in the first embodiment of this disclosure, the complex optical layer 160 includes a first light-enhancing film 170 and a second light-expanding layer 180.

It should be noted that relative terms such as "lower" or "bottom" and "on" or "top" may be used to describe the relationship between an element and another element in the present specification, as shown in the FIGs. It should be understood that, the purpose of using relative terms is to include the different directions of the devices not shown in the FIGs. For example, if a device in an attached FIG is turned upside down, an element described as being "under" another element will be "on top of" that element. Therefore, a descriptive term "under" may include the meaning of both "under" and "on top of", depending on the specific orientation of the attached drawings.

In the first embodiment, in the direction of the normal 101N of the light-emitting surface 101, the first light-enhancing film 170 is near the backlight source 150, and the second light-expanding layer 180 is positioned on the first light-enhancing film 170. In other words, the second light-expanding layer 180 is disposed between the first light-enhancing film 170 and the liquid crystal layer 120. The first light-enhancing film 170 includes a plurality of first prisms. The angle between the extending direction of the first prisms and the first direction d1 is equal to or less than 20 degrees (for example, 0 degree in this embodiment). The second light-expanding layer 180 includes a plurality of second microstructures, and the angle between the extending direction of the second microstructures and the first direction d1 is equal to or less than 20 degrees (for example, 0 degree in this embodiment). Correspondingly, the first light-expanding layer 130 includes a plurality of first microstructures, and the angle between the extending direction of the first microstructures and the second direction d2 is equal to or less than 20 degrees (for example, 0 degree in this embodiment). Elements of the first light-expanding layer 130 and the complex optical layer 160 will be described in detail.

Figure 3A:
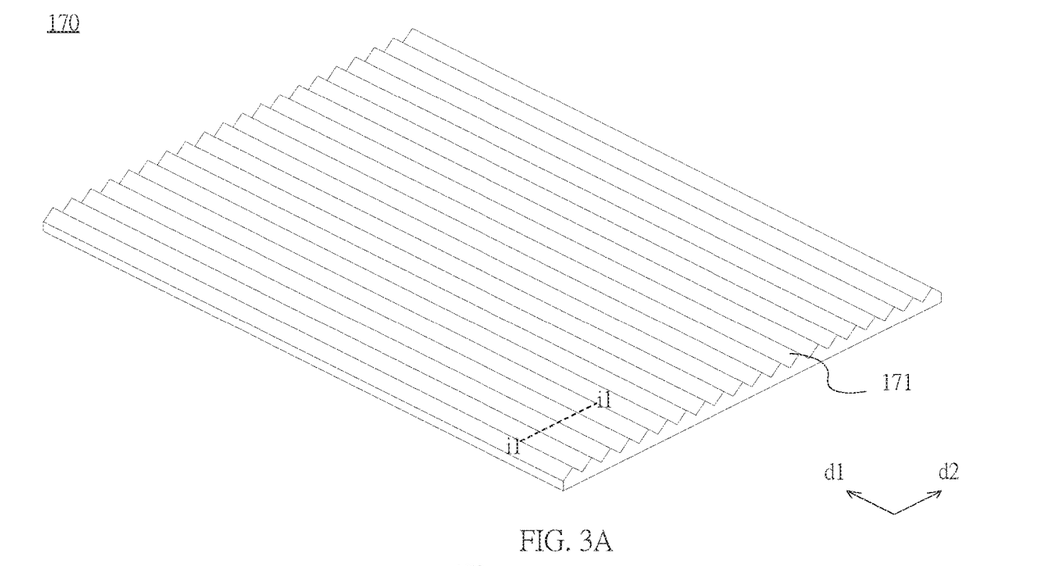
FIG. 3A illustrates a 3D schematic view of a first light-enhancing film of the first embodiment of this disclosure.
Figure 3B:
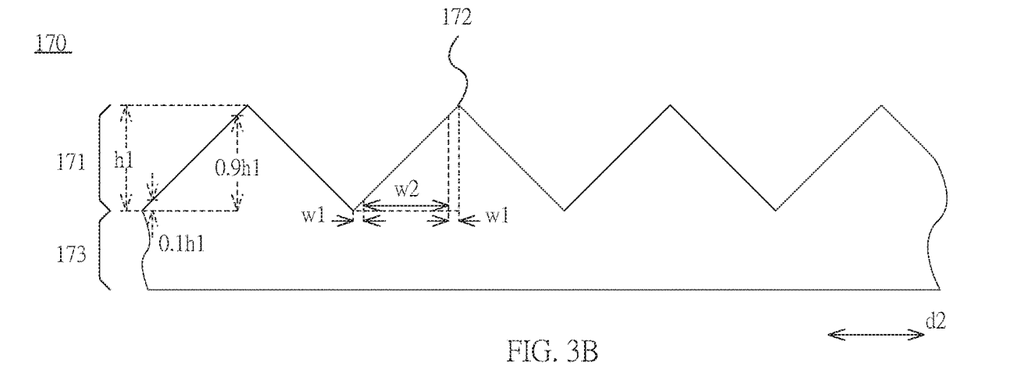
FIG. 3B illustrates a schematic cross-sectional view along the line i1-i1 in FIG. 3A.

FIG. 3A illustrates a 3D schematic view of a first light-enhancing film 170 of the first embodiment of this disclosure. FIG. 3B illustrates a schematic cross-sectional view along line i1-i1 in FIG. 3A. please refer to FIG. 3A; the first light-enhancing film 170 includes a plurality of first prisms 171. The angle between the extending direction of the first prisms and the first direction d1 is equal to or less than 20 degrees (for example, 0 degree in this embodiment). The first illumination light L1 from the backlight source 150 is focused in the forward direction by the first prisms 171 of the first light-enhancing film 170.

More specifically, please refer to FIG. 3B; the first prisms 171 of the first light-enhancing film 170 have a triangular cross section along the second direction d2. The apex angle 172 is a sharp angle. The first light-enhancing film 170 further includes, for example, a base layer 173. The first prisms 171 is formed on the base layer 173 to focus the light passing therethrough in the forward direction and enhance brightness. On the other hand, the refractive index of the material of the first light-enhancing film 170 is equal to or larger than 1.6. The material may be, for example, colloid doped with particles of high refractive index, preferably colloid having a refractive index of 1.5 and being doped with inorganic particles having refractive index equal to or larger than 1.7, so as to achieve excellent refraction effects and reduce the brightness at 60-degree viewing angle along the first direction d1 to an appropriate range. The first light-enhancing film 170 may be, for example, GL512J from Ubright Optronics Co. Refractive index of the material of the first prisms 171 is preferably 1.63.

In this embodiment, the structure of each of the first light-enhancing film 170, the first light-expanding layer 130 and the second light-expanding layer 180 has its own unique features. Of the features of the structure of the first light-enhancing film 170, the first light-expanding layer 130 and the second light-expanding layer 180, the shape feature is described as a slope region herein. When the height of the prisms or microstructures is denoted by h, the slope region of the prisms or microstructures is the part of the prisms or microstructures between 0.1h to 0.9h.

For example, referring to FIG. 3B, the height of the first prism 171 is denoted by h1, so the slope region of the first prism 171 is the part of the first prism 171 between 0.1h1 to 0.9h1, and the width of the projection of this part of the first prism 171 on the second direction d2 is w2; the width of the projection of the other parts of the first prism 171 is 2w1. Please also refer to FIG. 3A; the first prisms 171 extend along the first direction d1. The cross sections of the first prisms 171 are substantially the same in shape, and the side surfaces of the first prisms 171 are inclined planes. As a result, the ratio of the projected area of the slope region of the first light-enhancing film 170 on the base layer 173 (i.e., the projected area on a plane parallel to the light-emitting surface 101) to the area of the base layer 173 is substantially 80%. In other words, when the first prisms 171 are projected on a virtual plane parallel to the light-emitting surface 101, 80% of the projected area of the first prisms 171 is the projected area of the slope region.

Other elements will be defined with the slope region described above; note that the term "slope" is not intended to limit the shape of the area, but to distinguish the area from other areas.

Figure 3C:
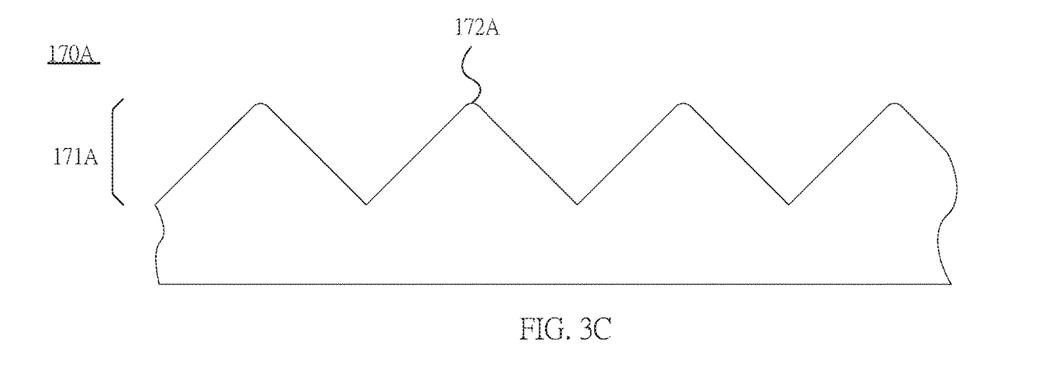
FIG. 3C illustrates a cross-sectional view of the first light-enhancing film of another embodiment of this disclosure.

On the other hand, the apex angle of the first prism of the first light-enhancing film is not limited to a sharp angle. Please refer to the schematic cross-sectional view the first light-enhancing film 170A of another embodiment in FIG. 3C; the apex angle of the first prism 171A can be a substantially round angle. Moreover, in some embodiments of this disclosure, the projected area of the slope region of the first light-enhancing film on a virtual plane parallel to the light-emitting surface is substantially 75% to 80% of the projected area of the first light-enhancing film on the virtual plane.

The terms "about", "approximate" or "essentially" used in the present specification include the value itself and the average values within the acceptable range of deviation of the specific values confirmed by a person having ordinary skill in the present art, considering the specific measurement discussed and the amount of errors related to such measurement (that is, the limitation of the measurement system). For example, "about" may mean within one or more standard deviations of the value itself, or within ±30%, ±20%, ±10%, ±5%. In addition, "about", "approximate" or "essentially" used in the present specification may select a more acceptable range of deviation or standard deviation based on optical property, etching property or other properties. One cannot apply one standard deviation to all properties.

Figure 4A:
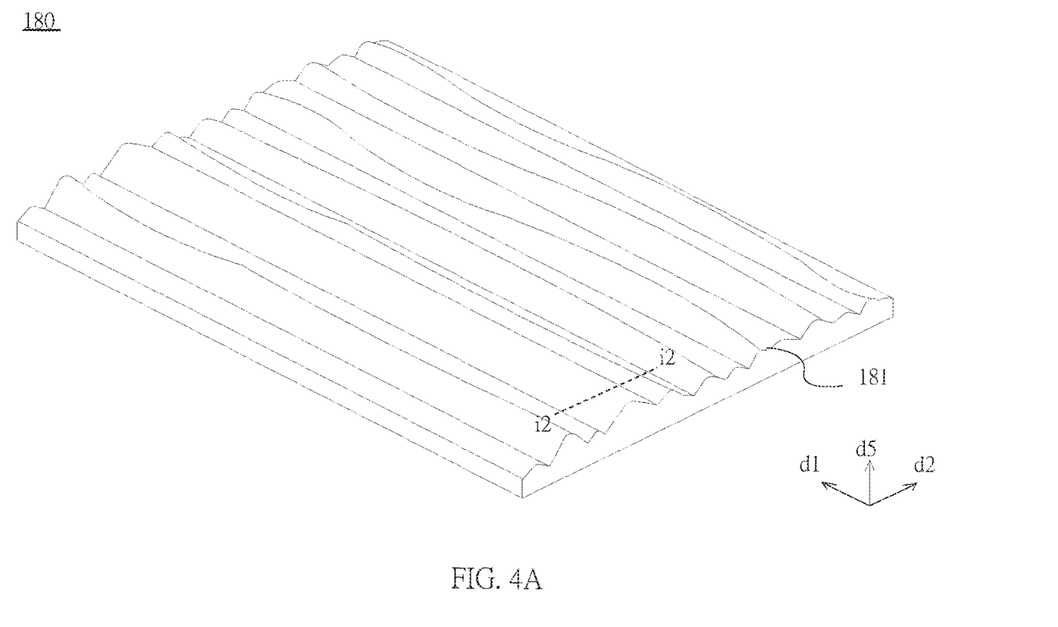
FIG. 4A illustrates a 3D schematic view of a second light-expanding layer of the first embodiment of this disclosure.
Figure 4B:
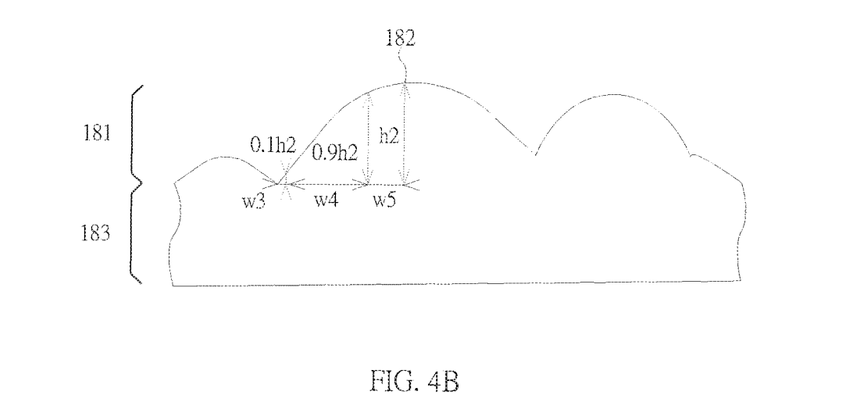
FIG. 4B illustrates a schematic cross-sectional view along the line i2-i2 in FIG. 4A.

FIG. 4A illustrates a 3D schematic view of a second light-expanding layer of the first embodiment of this disclosure. FIG. 4B illustrates a schematic cross-sectional view along line i2-i2 in FIG. 4A. Please refer to FIG. 4A; in one embodiment of this disclosure, the second light-expanding layer 180 includes a plurality of second microstructures 181. The angle between the extending direction of the second microstructures 181 and the first direction d1 is equal to or smaller than 20 degrees (for example, 0 degree in this embodiment). The second microstructures 181 substantially extend along first direction d1 and are arranged along the second direction d2. The thickness of the second microstructures 181 along the normal of the light-emitting surface (e.g. the fifth direction d5) may be modified to provide appropriate diffusing effects, but not limited thereto.

Please refer to FIG. 4B; compared to the apex angle 172 of the first prism 171 of the first light enhancing film 170, the radius of curvature of the apex angle 182 of the second light-expanding layer 180 is larger. The second light-expanding layer 180 further includes a base layer 183. The second microstructures 181 are formed on the base layer 183.

In this embodiment, on the virtual plane extended by the first light-expanding layer 130, the projected area of the slope region of the second microstructures 181 is smaller than the projected area of the slope region of the first prisms 171. More specifically, the virtual plane extended by the first light-expanding layer 130 is taken the light-emitting surface 101 which is parallel thereto as an example. Please refer to FIG. 4B, because the second microstructure 181 substantially has an arch-shaped cross section, when the size of the second light-expanding layer 180 and the first light-enhancing film 170 corresponds to the light-emitting surface 101, the projected area of the slope region of the second light-expanding layer 180 will be smaller than the projected area of the slope region of the first light-enhancing film 170.

Moreover, the ratio of the projected area of the slope region of each of the second microstructures 181 on the light-emitting surface 101 to the whole area of the light-emitting surface 101 can be calculated based on the formula given below:

$$(w4/(w3+w4+w5)) \times \%$$

wherein h1 is the height of the second microstructures 181; w3 is the width of the projected area of the part below 0.1h2 of the second microstructures 181 on a virtual plane parallel to the light-emitting surface 101; w4 is the width of the projected area of the part between 0.1h2 to 0.9h2 of the second microstructures 181 on the virtual plane parallel to the light-emitting surface 101; w5 is the width of the projected area of the part between 0.9h2 to h2 of the second microstructures 181 on the virtual plane parallel to the light-emitting surface 101. As calculated based on the formula given above, in this embodiment, the projected area of the slope region of the second light-expanding layer 180 on the light-emitting surface 101 is 20% to 75% of the area of the light-emitting surface 101, which is adapted to adjust the FWHM of the angular luminance distribution along the second direction d2 (such as the FWHM2 shown in FIG. 2), so appropriate collimation function is provided, and the image light L3 is provided with excellent diffusion function by the first light-expanding layer 130.

In the meantime, the second light-expanding layer 180 is substantially a one-dimensional light-expanding layer. Compared with a two-dimensional distributed light-expanding layer, light intensity at the 60-degree viewing angle along the first direction d1 is further reduced, resulting in the reduction of the light leakage of light-emitting surface 101.

Figure 5A:
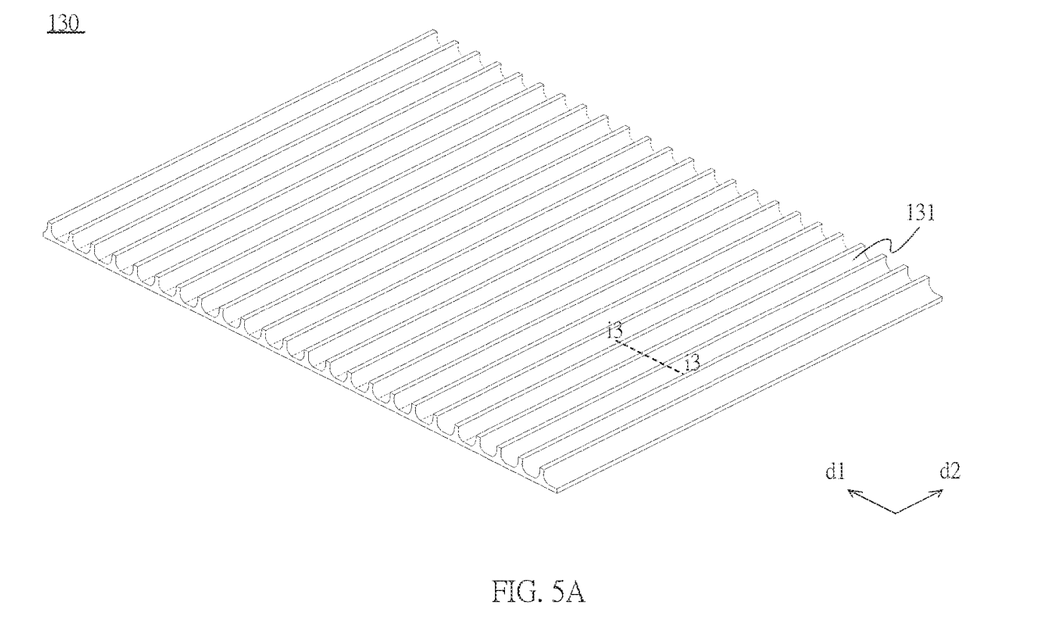
FIG. 5A illustrates a 3D schematic view of a first light-expanding layer of the first embodiment of this disclosure.
Figure 5B:
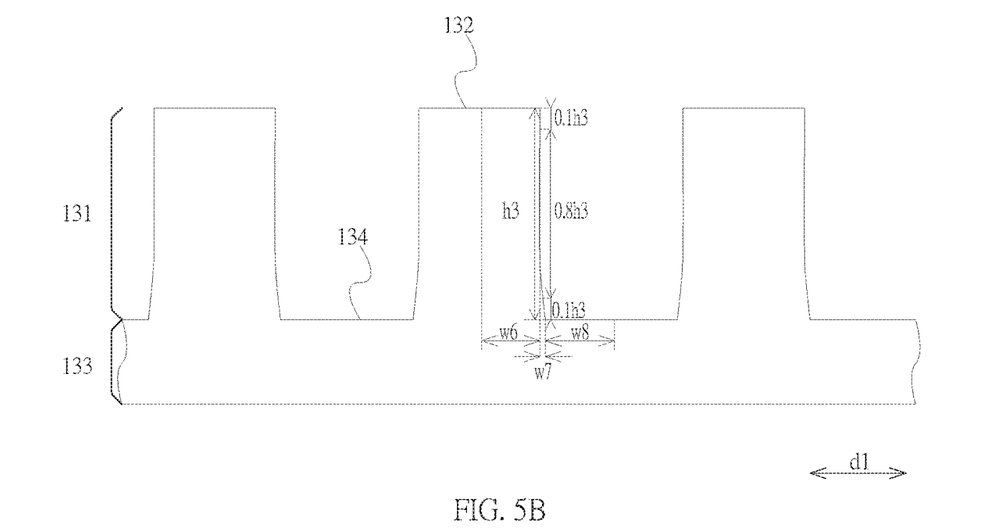
FIG. 5B illustrates a schematic cross-sectional view along the line i3-i3 in FIG. 5A.

FIG. 5A illustrates a 3D schematic view of a first light-expanding layer of the first embodiment of this disclosure. FIG. 5B illustrates a schematic cross-sectional view along line i3-i3 in FIG. 5A. Please refer to FIG. 5A; the first light-expanding layer 130 includes a plurality of first microstructures 131. The angle between the extending direction of the first microstructures 131 and the second direction d2 is equal to or smaller than 20 degrees (for example, 0 degree in this embodiment). The first light-expanding layer 130 may be, for example, a transparent optical lens layer.

This disclosure is not limited to the relative relationship between the first prisms 171, the first microstructures 131, the second microstructures 181, and the first direction d1, the second direction d2 in this embodiment. The angle between each of these structures and the first direction d1 or the second direction d2 may be equal to or smaller than 20 degrees. The angle of the extending direction of each of the structures can be adjusted to prevent patterns resulting from, for example, interference of light (such as the Moiré interference pattern).

In this embodiment, the projected area of the slope region of the first light-expanding layer 130 on the light-emitting surface 101 (or a virtual plane parallel to the extending direction of the first light-expanding layer 130) is smaller than the projected area of the slope region of the second light-expanding layer 180 on the light-emitting surface 101 (or the plane described above). Please refer to FIG. 5B; the first light-expanding layer 130 includes the first microstructures 131 and base layer 133, wherein the top surface 132 of the first microstructures 131 has a width, and the projected areas of the top surface 132 and the bottom surface 134 on unit area of the light-emitting surface 101 occupy a larger proportion than the projected area of the slope region on the unit area of the light-emitting surface 101.

More specifically, in the first embodiment of this disclosure, when the first microstructures 131 of the first light-expanding layer 130 are projected on the light-emitting surface 101 or a virtual plane parallel to the extending direction of the first light-expanding layer 130, the projected area of the slope region of the first microstructures 131 will be 1% to 20% of the area of the light-emitting surface 101. In other words, when the slope region of the first microstructures 131 is projected on the virtual plane described above, the projected area of the slope region is 1% to 20% of the projected area of the light-expanding layer 130 on this virtual plane. As a result, the first light-expanding layer 130 can ensure that the image light L4 can provide excellent image in large viewing angle range.

Figure 6:
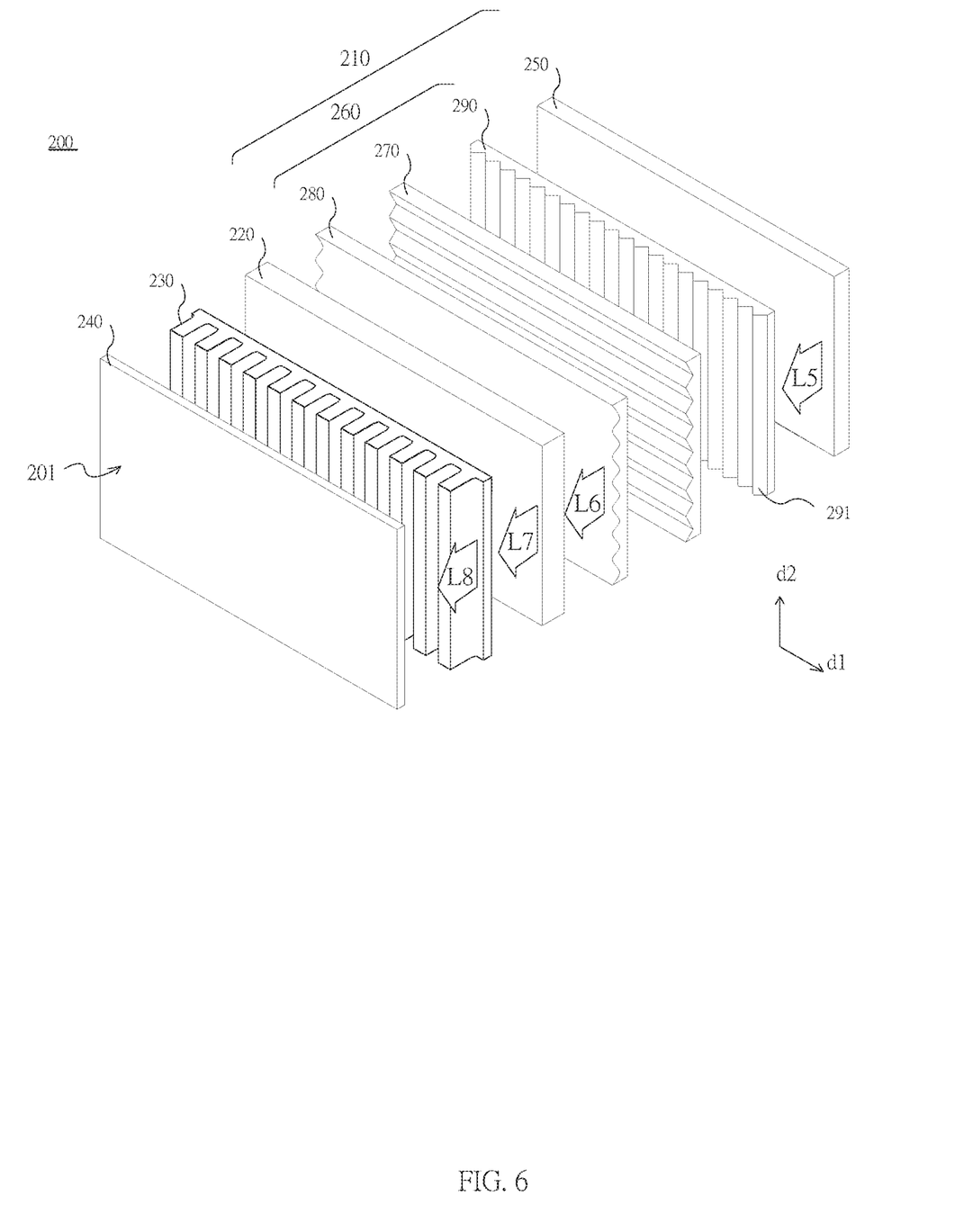
FIG. 6 illustrates a 3D exploded view of the display module of a second embodiment of this disclosure.

FIG. 6 illustrates a 3D exploded view of the display module of a second embodiment of this disclosure. Display module 200 is configured to provide an image on light-emitting surface 201. The display module 200 includes a backlight module 210 including a backlight source 250 and a complex optical layer 260, a liquid crystal layer 220, a first light-expanding layer 230, and a polarizer 240. The backlight source 250 emits a first illumination light L5, which forms a second illumination light L6 through the complex optical layer 260, a first image light L7 through the liquid crystal layer 220, a second image light L8 through the first light-expanding layer 230 and emits out from the light-emitting surface 201. The elements described above are similar to the elements of the display module 100 of the first embodiment, but the complex optical layer 260 is different.

Please refer to FIG. 6; in the second embodiment of this disclosure, the complex optical layer 260 includes a first light-enhancing film 270 and a second light-expanding layer 280. The first light-enhancing film 270 and the second light-expanding layer 280 are arranged sequentially along the normal of the light-emitting surface 201 from the side near the backlight source 250. The complex optical layer 260 further includes a second light-enhancing film 290. The light-enhancing film 290 is disposed on a side of the first light-enhancing film 270 adjacent to the backlight source 250, i.e., the first light-enhancing film 270 is disposed on the second light-enhancing film 290. The second light-enhancing film 290 is disposed on the backlight source 250, preferably on the light guide plate of the backlight source 250. In other embodiments, the second light-enhancing film 290 may be disposed on the diffuser plate of the backlight source 250, but not limited thereto.

The second light-enhancing film 290 includes a plurality of second prisms 291. The angle between the extending direction of the second prisms 291 and the second direction d2 is equal to or smaller than 20 degrees (for example, 0 degree in this embodiment), so that the light pattern of the second illumination light L6 is improved.

Figure 7A:
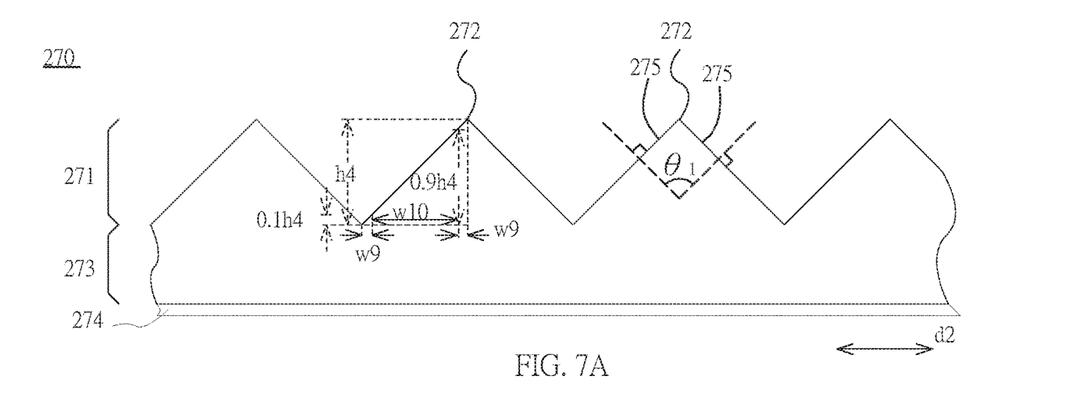
FIG. 7A illustrates a schematic cross-sectional view of a first light-enhancing film of the second embodiment of this disclosure.
Figure 7B:
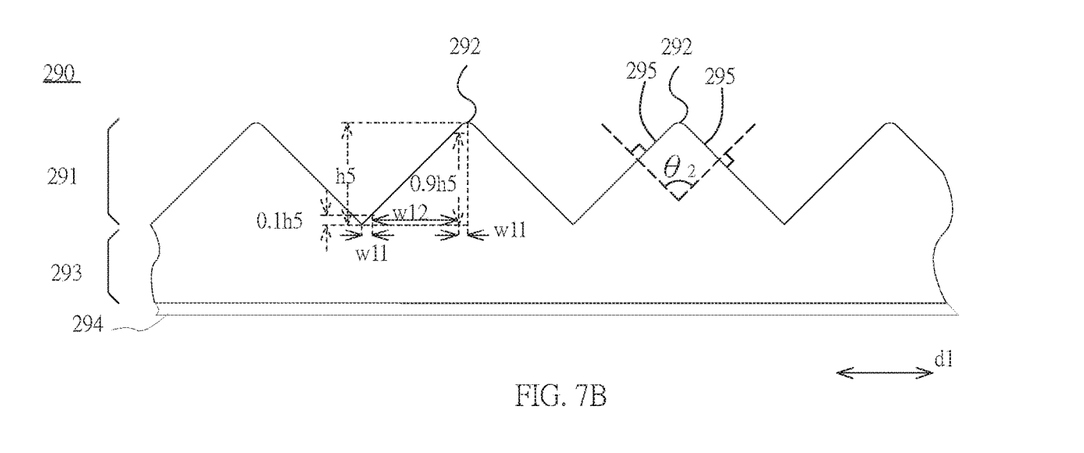
FIG. 7B illustrates a schematic cross-sectional view of a second light-enhancing film of the second embodiment of this disclosure.

FIG. 7A illustrates a schematic cross-sectional view along a line parallel to second direction d2 of the first light-enhancing film of the second embodiment of this disclosure. FIG. 7B illustrates a schematic cross-sectional view along a line parallel to first direction d1 of a second light-enhancing film of the second embodiment of this disclosure. Please refer to FIG. 7A and FIG. 7B. Each of the first prisms 271 includes two first slope surfaces 275, and the two first slope surfaces 275 are connected to each other and form the first apex angle 272. Each of the second prisms 291 includes two second slope surfaces 295, and the two second slope surfaces 295 are connected to each other and form the second apex angle 292. Both of the first apex angle 272 and the second apex angle 292 may be a sharp angle or a round angle. In the second embodiment of this disclosure, the radius of curvature of the second apex angle 292 is equal to or larger than the radius of curvature of the first apex angle 272, and the first apex angle 272 is substantially a sharp angle (i.e. the radius of curvature of the first apex angle 272 is near zero). In other embodiments, the second apex angle 292 may be a sharp angle.

In this embodiment, the projected area of the slope region of the first prisms 271 on the light-emitting surface 201 is larger than or equal to the projected area of the slope region of the second prisms 291 on the light-emitting surface 201. More specifically, please refer to FIG. 7A and FIG. 7B, the height of the first prisms 271 is denoted, for example, by h4. The projected width of the slope region of the first prisms 271 (i.e., the part between 0.1h4 to 0.9h4) is w10. Consequently, the ratio of the projected area of the slope region of the first prisms 271 on the light-emitting surface 201 or a virtual plane parallel to the light-emitting surface 201 to the area of the light-emitting surface 201 can be calculated based on the following equation:

$$R1\% = ((w10)/(2w9+w10)) \times \%.$$

The height of the second prisms 291 is, for example, h5. The projected width of the slope region of the second prisms 291 (i.e., the part between 0.1h5 to 0.9h5) is w12. Consequently, the ratio of the projected area of the slope region of the second prisms 291 on the light-emitting surface 201 or a virtual plane parallel to the light-emitting surface 201 to the area of the light-emitting surface 201 can be calculated based on the following equation:

$$R2\% = ((w12)/(2w11+w12)) \times \%.$$

In this embodiment, the radius of curvature of the second apex angle 292 may be increased, so R1%≥R2%. Through the first light-enhancing film 270, the intensity at 60-degree viewing angle of the second illumination light L6, which is used to form the image light L7 in the display module 200 of this embodiment, is lowered to an appropriate range. Through the second light-enhancing film 290, the FWHM of the angular luminance distribution of the second illumination light L6 may be adjusted to an appropriate value.

In some embodiments of this disclosure, the height of each of the first prisms, second prisms, first microstructures, and second microstructures is equal to or higher than 0.5 micrometers to provide an appropriate optical condensation or diffusion effect.

In addition to the difference in radius of curvature of the apex angle, the display module of the second embodiment can adjust the FWHM of the angular luminance distribution of the second illumination light L6 by adjusting the first apex angle 272 of the first prisms 271 and the second apex angle 292 of the second prisms 291. Preferably, the second apex angle 292 is larger than or equal to the first apex angle 272. The first apex angle 272 of the first prisms 271 is preferably 90 degrees, so the luminance at high viewing angles along the first direction d1 may be reduced. The second apex angle 292 of the second prisms 291 is preferably larger than 90 degrees, so the FWHM of the angular luminance distribution may be maintained. In other words, in this embodiment, the angle between the normal of the two first slope surfaces 275 is a first angle θ1, the angle between the normal of the two second slope surfaces 295 is a second angle θ2, and the second angle θ2 is smaller than or equal to the first angle 81.

On the other hand, in this embodiment, the refractive index of the material of the first prisms 271 is equal to or larger than the refractive index of the material of the second prisms 291, so the first prisms 271 may further adjust the luminance at 60-degree viewing angle along the first direction d1 through the high refractive index of the material of the first prisms 271. For example, the material of the first light-enhancing film 270 may be, for example, a colloid having a refractive index of 1.5 and being doped with inorganic particles having a high refractive index (equal to or larger than 1.7). The material of the second light-enhancing film 290 may be, for example, a colloid having a refractive index within the range of 1.49 to 1.55.

In this embodiment, each of the first light-enhancing film 270 and the second light-enhancing film 290 includes a matte surface. the FWHM of the angular luminance distribution of the second illumination light L6 is adjusted with the haze of the matte surface of the second light-enhancing film 290, which is larger than the haze of the matte surface of the first light-enhancing film 270. Please refer to FIG. 7A and FIG. 7B. The first light-enhancing film 270 has a matte surface 274, and the second light-enhancing film 290 has a matte surface 294. The haze of the matte surface 274 may be decreased to keep the luminance at 60-degree viewing angle along the first direction d1 from being overly high. The haze of the matte surface 294 may substantially be 30% to maintain the FWHM of the angular luminance distribution.

In some embodiments of this disclosure, the complex optical layer may improve the luminance distribution by a dual brightness enhancement film, decreasing the light leakage on the light-emitting surface.

Figure 8A:
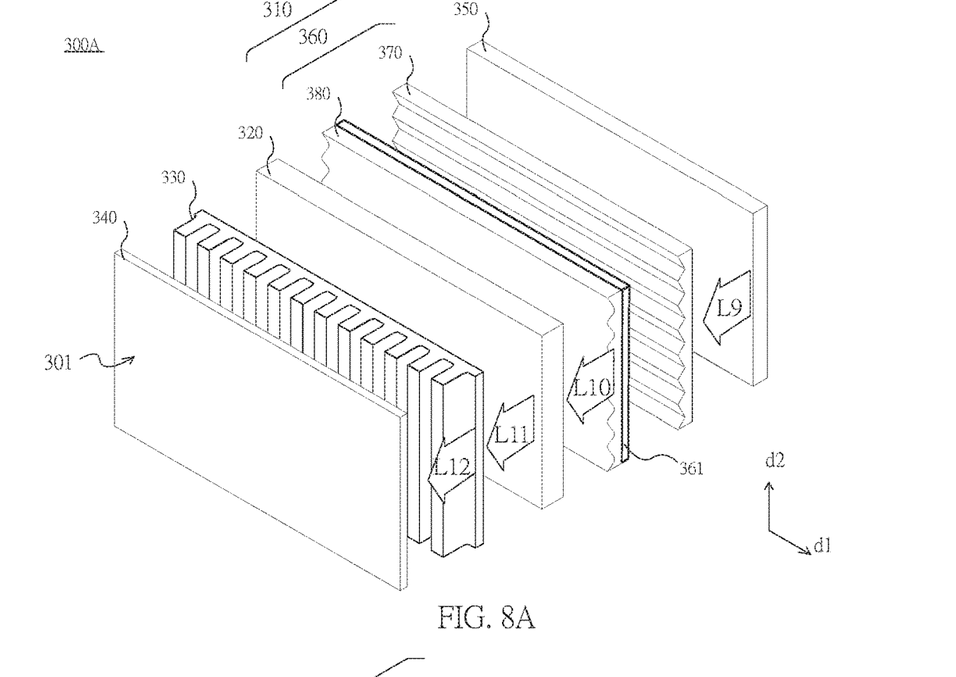
FIG. 8A illustrates a 3D exploded view of the display module of a third embodiment of this disclosure.

Please refer to the three-dimensional exploded view of the third embodiment shown in FIG. 8A, wherein the display module 300A is similar to the display module 100 of the first embodiment described above. The display module 300A is configured to generate an image light for forming an image. The display module 300A includes a backlight module 310 including a backlight source 350 and a complex optical layer 360 including a first light-enhancing film 370 and a second light-expanding layer 380, a liquid crystal layer 320, a first light-expanding layer 330, and a polarizer 340. Different from the display module 100 of the first embodiment, the complex optical layer 360 of the display module 300 further includes the dual brightness enhancement film 361 that is disposed on the side of the second light-expanding layer 380 near the backlight source 350. The dual brightness enhancement film 361 may be, for example, the 3M™ DBEF QV2. The dual brightness enhancement film 361 can increase the luminance of the light propagating in the forward direction, i.e., increase the light utilization efficiency. As a result, the dual brightness enhancement film 361 may enable the second illumination light L10 of the display module 300A to have a good luminance distribution, so that the image light L11 formed by the liquid crystal layer 320 may, after going through the first light-expanding layer 330, form the image light L12 that is able to provide an image at a larger viewing angle range.

Figure 8B:
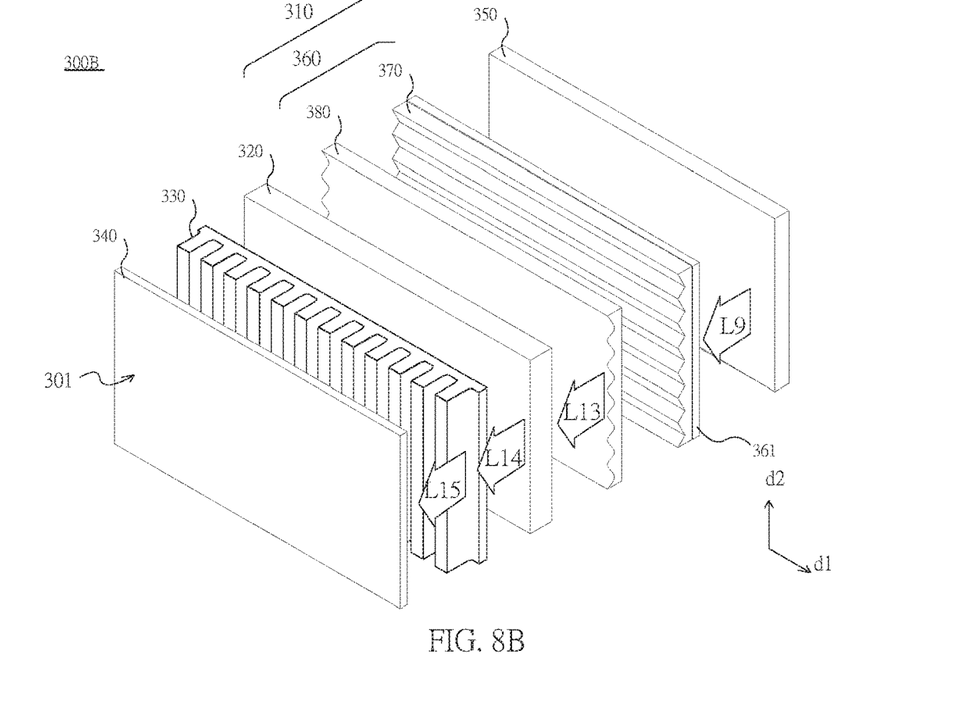
FIG. 8B illustrates a 3D exploded view of the display module of another embodiment of this disclosure.

The position of the dual brightness enhancement film 361 of this disclosure is not limited to the third embodiment described above. Please refer to the display module 300B in another embodiment illustrated in FIG. 8B, wherein the dual brightness enhancement film 361 is disposed on a side of the first light-enhancing film 370 that is near the surface of the backlight source 350, so the intensity of the second illumination light L13 propagating in the forward direction may be increased, i.e., the collimation of the second illumination light L13 will be higher than the collimation of the second illumination light L10. In other words, the divergence angle of the illumination light will become smaller after going through the dual brightness enhancement film 361. Preferably, the plurality of first prisms on the first light-enhancing film 370 may be directly coated on the dual brightness enhancement film 361, so that the polarization direction of the second illumination light L13 may be maintained in an appropriate range, decreasing influences on the illumination light L14 and the illumination light L15. On the other hand, with the disposition of the dual brightness enhancement film 361, the material of the first light-enhancing film 370 may be selected from materials having refractive index in the range of 1.49 to 1.55 to reduce the manufacturing cost, or materials with higher refractive index may be selected to further increase the collimation of the second illumination light L13.

Figure 9A:
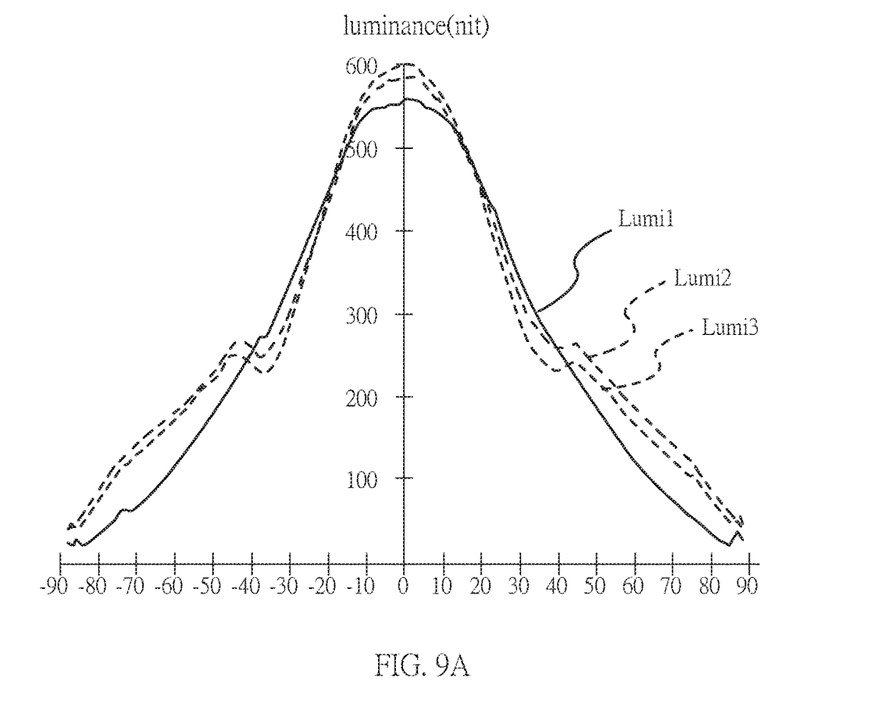
FIG. 9A shows the luminance distribution of an embodiment of this disclosure and two comparative embodiments at different viewing angles along the first direction under high brightness.
Figure 9B:
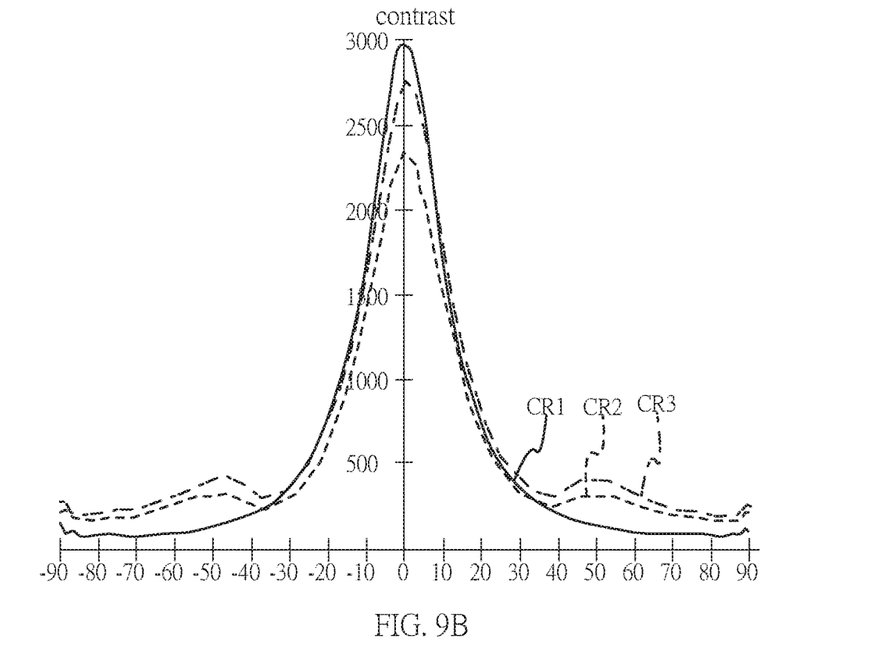
FIG. 9B shows the contrast distribution of an embodiment of this disclosure and two comparative embodiments at different viewing angles along the first direction under high brightness.

Some examples will be given to describe the effects of the display module provided by this disclosure. FIG. 9A shows the luminance distributions of an embodiment and two comparative embodiments at different viewing angle along the first direction (i.e., the 3-9 o'clock direction) under high brightness, wherein the vertical axis represents the luminance (unit: nit) and the horizontal axis represents the viewing angle (unit: degrees). FIG. 9B shows the contrast distribution of an embodiment and two comparative embodiments at different viewing angle along the first direction under high brightness, wherein the vertical axis represents the contrast and the horizontal axis represents the viewing angle (unit: degrees). In this example, the display module is similar to the display module 200 in the second embodiment. The display module includes a backlight module, a liquid crystal layer and a first light-expanding layer. In a direction approaching to the liquid crystal layer, the backlight module of this example sequentially includes a backlight source, a second light-enhancing film, a first light-enhancing film, and a second light-expanding layer. The backlight module may further include the dual brightness enhancement film described above between the second light-expanding layer and the first light-enhancing film.

More specifically, in this embodiment, the first light-expanding layer substantially extends along a virtual plane. The shape of the first light-expanding film is substantially similar to the shape of the first light-expanding layer illustrated in FIG. 5B, but the projected area of the slope region on the virtual plane described above is substantially 7% of the projected area of the first light-expanding layer on the virtual plane.

The second light-expanding layer is substantially a one-dimensional diffuser, preferably a diffuser with a diffusion angle (or divergence angle) of 20 degrees.

The refractive index of the material of the first prisms of the first light-enhancing film is substantially 1.63. The angle between the normals of the two slope surfaces of each of the first prisms is 90 degrees (i.e., the angle between the two slope surfaces of the cross-section perpendicular to the extending direction of the first prisms is 90 degrees). The apex angle of the first prisms is defined as the angle r1, and the haze of the surface of the first light-enhancing film facing away from the liquid crystal layer is 4%.

The refractive index of the material of the second prisms of the second light-enhancing film is substantially 1.52. The angle between the normals of the two slope surfaces of each of the first prisms is 90 degrees (i.e., the angle between the two slope surfaces of the cross-section perpendicular to the extending direction of the second prisms is 90 degrees). The apex angle of the first prisms is defined as the angle r7, and the haze of the surface of the second light-enhancing film facing away from the liquid crystal layer is 8%.

Please refer to FIG. 9A; Lumi3 is the luminance distribution of this embodiment. Lumi2 is the luminance distribution of a comparative embodiment using the first light-expanding layer and liquid crystal layer of the embodiment with a conventional backlight. Lumi1 is the luminance distribution of a comparative embodiment using a conventional display module. In other words, Lumi2 is the luminance distribution of a conventional wide viewing angle display module. As can be seen from FIG. 9A, the luminance distribution of the display module of this embodiment can be further increased at the larger viewing angle. The content of FIGS. 9A-9B and FIGS. 10A-10B are measured, for example, on the basis of the light-emitting of the first light-expanding layer of the display module. That is, the luminance distribution shown in the figures may correspond to the angular luminance distribution of the image light provided by the display module at every viewing angle.

Please refer to FIG. 9B; CR3 is the distribution of contrast of this embodiment. CR2 is the distribution of contrast of a comparative embodiment of a conventional wide viewing angle display module. CR1 is the luminance distribution of another comparative embodiment of a conventional display module. As shown in FIG. 9B, the display module of this embodiment can mitigate the decrease in contrast while the viewing angle range of the viewable displayed image is increased (e.g. CR3 is lower than CR1 by less than 10%), so a displayed image with high luminance and high contrast can be achieved.

Figure 10A:
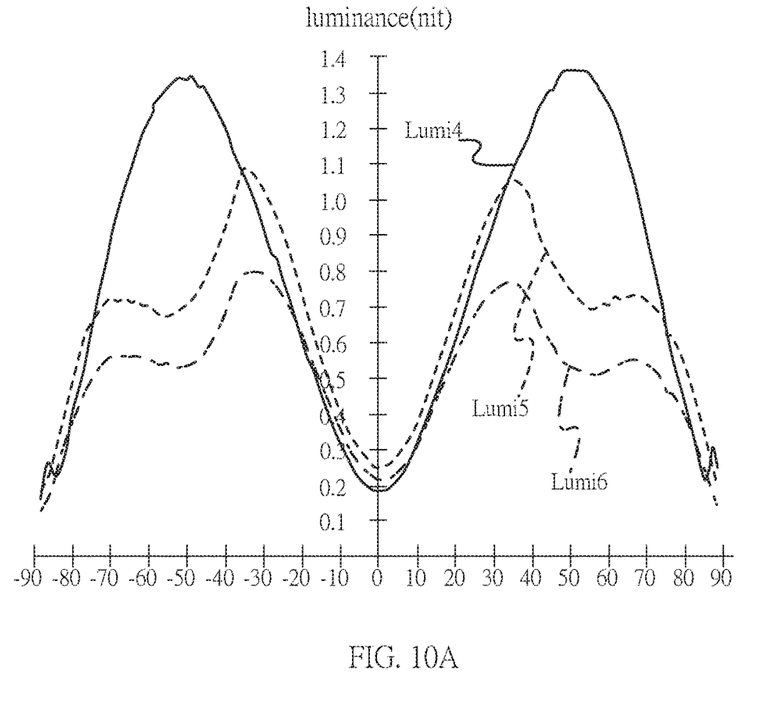
FIG. 10A shows the luminance distribution of an embodiment of this disclosure and two comparative embodiments at different viewing angles along the first direction under low brightness.
Figure 10B:
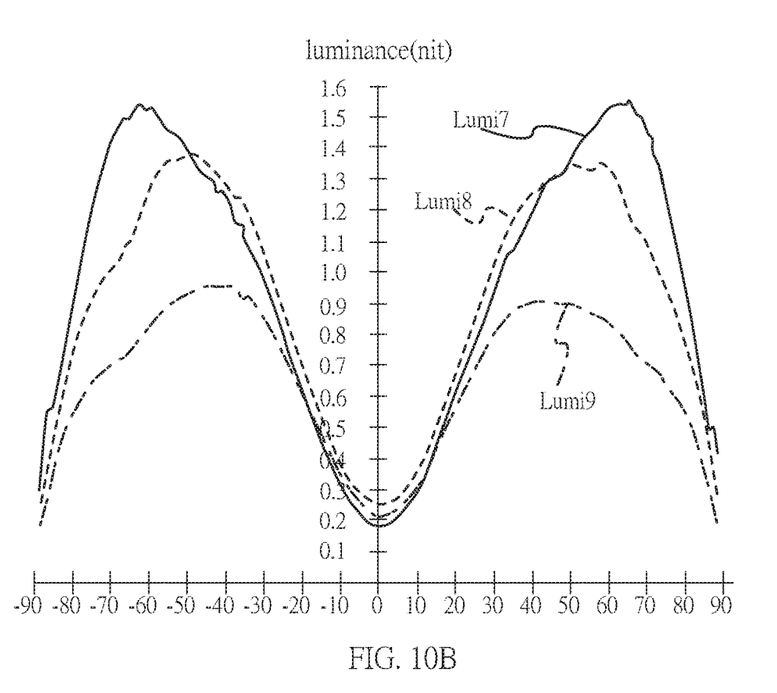
FIG. 10B shows the luminance distribution of an embodiment of this disclosure and two comparative embodiments at different viewing angles along the third direction under low brightness.

FIG. 10A shows the angular luminance distribution of an embodiment and two comparative embodiments along the first direction (i.e., the 3-9 o'clock direction of the displayed image) under low brightness, wherein the vertical axis represents luminance (unit: nits) and the horizontal axis represents the viewing angle (unit: degrees). FIG. 10B shows the luminance distribution of an embodiment and two comparative embodiments along the third direction (i.e., the 1.5-7.5 o'clock direction of the display image) under low brightness, wherein the vertical axis represents luminance (unit: nits) and the horizontal axis represents viewing angle (unit: degrees).

Please refer to FIG. 10A; the embodiment of the disclosure can improve the luminance distribution (e.g. luminance distribution Lumi6) when the luminance is low. Compared to the luminance distribution Lumi5 of a conventional wide viewing angle display module and the luminance distribution Lumi4 of a displayed image of a conventional display module, luminance can be notably lowered in the large viewing angle range (for example, in the range of 50 degrees to 70 degrees), i.e., the light leakage can be reduced.

Please refer to FIG. 10B; the display module of this embodiment can also lower the luminance distribution (Lumi9) along the third direction (i.e., the direction that is perpendicular to the normal of the light-emitting surface and forms a 45 degrees angle with the first direction) when the luminance is low. Compared to the luminance distribution Lumi8 of a conventional wide viewing angle display module and the luminance distribution Lumi7 of a display image of a conventional display module, luminance can be notably lowered in the large viewing angle range (for example, in the range of 50 degrees to 70 degrees), i.e., light leakage can be reduced.

As described above, the display module of this disclosure can provide second illumination light through the complex optical layer, and the angular luminance distribution of the second illumination light along the first direction is more concentrated than the angular luminance distribution of the second illumination light along the second direction, so the light-emitting surface can provide an image with wide viewing angle while light leakage in the displayed image can be prevented.

Unless defined otherwise, all technical and scientific terms used herein have the same meanings as commonly understood by one of ordinary skill in the art to which this invention belongs. Also, it should be understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, areas that are illustrated or described to be flat may possess rough and/or nonlinear characteristics. In addition, angles that are illustrated or described to be sharp may be round. Accordingly, the area illustrated in the Figures are schematic and their shapes are not intended to show the precise shape, and are not intended to limit the scope of the claims.

What is claimed is:

1. A display module, comprising:
a backlight module providing a surface light source;
a liquid crystal layer disposed on the backlight module; and
a first light-expanding layer disposed on the liquid crystal layer, wherein the surface light source forms an image light through the liquid crystal layer, and the first light-expanding layer increases the viewing angle range of the image light along a first direction, the first light-expanding layer substantially extends along a virtual plane, and the first direction is perpendicular to a normal of the virtual plane,
wherein a luminance of the surface light source at 60-degree viewing angle along the first direction is lower than the luminance of the surface light source at 60-degree viewing angle along a second direction, the second direction is perpendicular to the first direction and the normal of the virtual plane, and the viewing angle is an angle between an observing direction and the normal of the virtual plane, and
the luminance of the light source at 60-degree viewing angle along a third direction is lower than the luminance of the light source at the 60-degree viewing angle along the second direction, an angle between the third direction and the first direction is 45 degrees, and the third direction is perpendicular to the normal of the virtual plane.

2. The display module of claim 1, wherein, along the first direction, the luminance of the surface light source at the 60-degree viewing angle is 6% to 12% of the luminance of the surface light source at 0-degree viewing angle.

3. The display module of claim 1, wherein, along the second direction, the luminance of the surface light source at the 60-degree viewing angle is equal to or larger than 19% of the luminance of the surface light source at 0-degree viewing angle.

4. The display module of claim 1, wherein, along the third direction, the luminance of the surface light source at the 60-degree viewing angle is 6% to 12% of the luminance of the surface light source at 0-degree viewing angle.

5. The display module of claim 1, wherein the first light-expanding layer comprises a plurality of first microstructures, and an angle between an extending direction of the first microstructures and the second direction is less than or equal to 20 degrees.

6. The display module of claim 5, wherein the backlight module comprises:
a backlight source providing a first illumination light; and
a complex optical layer disposed on the backlight source, wherein the first illumination light forms a second illumination light after going through the complex optical layer, the second illumination light forms the surface light source, and the complex optical layer comprises:
a first light enhancing film comprising a plurality of first prisms, wherein an angle between an extending direction of the first prisms and the first direction is equal to or less than 20 degrees; and a second light-expanding layer comprising a plurality of second microstructures, wherein an angle between an extending direction of the second microstructures and the first direction is equal to or less than 20 degrees.

7. The display module of claim 6, wherein when a height of each of the first prisms, the first microstructures, or the second microstructures along the normal of the virtual plane is denoted by h, a slope region of the first light-enhancing film, the first light-expanding layer or the second light-expanding layer is a part of each of the first prisms, the first microstructures, or the second microstructures between 0.1h and 0.9h along the normal of the virtual plane; on the virtual plane, a projected area of the slope region of the first light-expanding layer is less than a projected area of the slope region of the second light-expanding layer, and the projected area of the slope region of the second light-expanding layer is less than a projected area of the slope region of the first light-enhancing film.

8. The display module of claim 7, wherein, on the virtual plane,
the projected area of the slope region of the first light-expanding layer is 1% to 20% of a projected area of the first light-expanding layer;
the projected area of the slope region of the second light-expanding layer is 20% to 75% of a projected area of the second light-expanding layer;
the projected area of the slope region of the first light-enhancing film is 75% to 80% of a projected area of the first light-enhancing film.

9. The display module of claim 6, wherein a refractive index of a material of the first light-enhancing film is equal to or larger than 1.6.

10. The display module of claim 6, wherein the complex optical layer further comprises a second light-enhancing film near the backlight source and between the first light-enhancing film and the backlight source, the second light-enhancing film comprises a plurality of second prisms, and an angle between an extending direction of the second prisms and the second direction is equal to or less than 20 degrees.

11. The display module of claim 10, wherein when a height of each of the first prisms or the second prisms along the normal vector of the virtual plane is denoted by h, a slope region of the first light-enhancing film, or the second light-enhancing film is a part of each of the first prisms, or the second prims between 0.1h and 0.9h along the normal of the virtual plane;
on the virtual plane, a projected area of the slope region of the second light-enhancing film is less than a projected area of the slope region of the first light-enhancing film.

12. The display module of claim 10, wherein each of the first prisms has a first apex angle, the first apex angle is a sharp angle or a round angle; each of the second prisms has a second round angle; when the first apex angle is the round angle, a radius of curvature of the second round angle is greater than a radius of curvature of the first apex angle.

13. The display module of claim 10, wherein the first light-enhancing film and the second light-enhancing film each forms a matte surface on a side facing the backlight source, a haze of the matte surface of the second light-enhancing film is larger than a haze of the matte surface of the first light-enhancing film.

14. The display module of claim 10, wherein a refractive index of a material of the first prism is equal to or larger than a refractive index of the material of the second prism.

15. The display module of claim 10, wherein each of the first prisms comprises two first inclined surfaces connected to form a first apex angle, wherein normals of the two first inclined surfaces are substantially perpendicular to each other.

16. The display module of claim 10, wherein each of the first prisms of the first light-enhancing film comprises two first inclined surfaces connected to form a first apex angle; each of the second prisms of the second light-enhancing film comprises two second inclined surfaces connected to form a second apex angle; a first angle between normals of the two first inclined surfaces is equal to or less than a second angle between normals of the two second inclined surfaces.

17. The display module of claim 6, wherein the complex optical layer further comprises:
a dual brightness enhancement film disposed on a side of the second light-expanding layer near the first light-enhancing film;
after going through the dual brightness enhancement film, the first illumination light has a polarization direction and a divergence angle of the first illumination light becomes smaller.

18. The display module of claim 6, wherein the complex optical layer further comprises:
a dual brightness enhancement film disposed on a side of the first light-enhancing film near the backlight source;
after going through the dual brightness enhancement film, the first illumination light has a polarization direction and a divergence angle of the first illumination light becomes smaller.

19. The display module of claim 6, wherein the backlight source comprises a plurality of light-emitting units, the light-emitting units form a direct-lit backlight with local dimming function.

* * * * *